United States Patent
Holtcamp et al.

(10) Patent No.: US 6,420,580 B1
(45) Date of Patent: Jul. 16, 2002

(54) CATALYST COMPOSITIONS AND METHOD OF POLYMERIZATION THEREWITH

(75) Inventors: Matthew W. Holtcamp, Huffman; Ching-Tai Lue, Houston, both of TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/434,696

(22) Filed: Nov. 5, 1999

(51) Int. Cl.$^7$ .................................................. C07F 7/08
(52) U.S. Cl. ............................ 556/11; 526/126; 556/12
(58) Field of Search .......................... 520/126; 556/11, 556/12

(56) References Cited

U.S. PATENT DOCUMENTS

| | | | |
|---|---|---|---|
| 5,565,592 A | 10/1996 | Patsidis et al. ............... | 556/11 |
| RE37,208 E * | 6/2001 | Winter et al. ............. | 556/11 X |
| 6,242,622 B1 * | 6/2001 | Oda et al. ..................... | 556/11 |
| 6,248,912 B1 * | 6/2001 | Lang et al. .................... | 556/11 |
| 6,252,097 B1 * | 6/2001 | Sugano et al. ................. | 556/11 |
| 6,252,098 B1 * | 6/2001 | Winkler et al. ................ | 556/11 |
| 6,255,506 B1 * | 7/2001 | Kuber et al. .................... | 55/11 |
| 6,262,197 B1 * | 7/2001 | Aulbach et al. .......... | 556/11 X |
| 6,262,201 B1 * | 7/2001 | Welch et al. ............. | 556/11 X |

FOREIGN PATENT DOCUMENTS

| | | |
|---|---|---|
| EP | 0 384 264 A1 | 2/1990 |
| EP | 0 407 870 A2 | 7/1990 |
| EP | 0 610 852 A1 | 2/1994 |
| EP | 0586167 A1 | 3/1994 |
| EP | 0 645 401 A1 | 9/1994 |
| EP | 0745607 A2 | 12/1996 |
| WO | WO 99/00398 | 1/1999 |

\* cited by examiner

*Primary Examiner*—Paul F. Shaver
(74) *Attorney, Agent, or Firm*—Jaimes Sher

(57) ABSTRACT

Catalyst compositions, systems and methods, useful in polymerization processes, are disclosed, which utilize bridged metallocene catalysts, preferably including indenyl groups, bound to the transition metal and a vinyl group bound to the bridge.

17 Claims, No Drawings

CATALYST COMPOSITIONS AND METHOD OF POLYMERIZATION THEREWITH

FIELD OF THE INVENTION

This invention relates to bridged metallocene catalysts comprising bulky ligand groups, and in particular, indenyl groups, bound to the transition metal and a vinyl group bound to the bridge. It has been found that the presence of the vinyl moiety on the bridging group dramatically improves the melt strength and reduces the melt index ratio (MIR) of the resulting polymer.

BACKGROUND OF THE INVENTION

EP 0 745 607 A2 discloses "double bound metallocenes" i.e. metallocenes having both a pi and sigma carbon bond to the transition metal.

EP 0 586 167 A1 discloses supported metallocene complexes having a polymerizable group, preferably containing at least three carbon atoms, on the cyclopentadienyl groups or the group bridging the Cp groups that allegedly produce a higher molecular weight polymer. The data in the examples relates to cyclopentadienyl rings having the unsaturated group. The molecular weight effect has not been observed for unsaturations on the bridging group, however.

U.S. Pat. No. 5,565,592 discloses cyclopentadienyl compounds having bridged cyclopentadiene-type ligands having a bridge having a branch that has a terminal vinyl group, particularly a bis fluorenyl bridged metallocene where the Si bridge has a —CH=CH$_2$ group and an R" group, where R" is selected from the group consisting of hydrogen alkyl groups having 1 to 10 carbon atoms, and aryl groups having 6 to 10 carbon atoms. The examples relates to the slurry phase polymerization of ethylene with fluorenyl metallocenes rather than the gas phase polymerization of indenes.

Thus there is a need in the art to produce polymers having both good melt index ratios and good melt strength.

SUMMARY OF THE INVENTION

This invention relates to a catalyst system, a polymerization process using that catalyst system, polymer produced therefrom and products produced from such polymer.

In one aspect, the invention relates to catalyst compositions and systems including a bridged metallocene catalysts having bulky ligand groups, and in particular, indenyl groups, bound to the transition metal and a vinyl group bound to the bridge.

In another aspect, the invention relates to processes for polymerizing olefin(s) utilizing the above catalyst compositions and systems.

In another aspect, the invention relates to polymers prepared utilizing the above catalyst composition and systems.

DETAILED DESCRIPTION OF THE INVENTION

In a preferred embodiment an activator is combined with a transition metal compound represented by the formula:

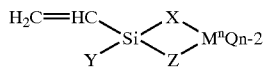

wherein
Y is hydrogen or a hydrocarbyl group, preferably hydrogen or methyl, a halogen or heteroatom, M is a group 4 metal, preferably zirconium or hafnium, preferably zirconium, and n is the oxidation state of the metal, preferably 3 or 4, preferably 4.

Each Q is, independently, an anionic leaving group, preferably a hydride, substituted or unsubstituted hydrocarbyl, halide, substituted or unsubstituted carboxylate, a substituted or unsubstituted heteroatom, substituted or unsubstituted alkoxide, substituted or unsubstituted aryloxide, substituted or unsubstituted amide, substituted or unsubstituted phosphide, or other types of bulky ligands including but not limited to bulky amides, phosphides, alkoxides, aryloxides, imides, carbolides, borollides, porphyrins, phthalocyanines, corrins and other polyazomacrocycles any two Q's can be bound together or form a ring, an alkylidene ligand, or a cyclometallated ligand or other divalent chealating ligand.

The bulky ligands, X and Z are independently open, acyclic or fused ring(s) or ring system(s) and are any ancillary ligand system. Non-limiting examples of bulky ligands include, cyclopentaphenanthreneyl ligands, indenyl ligands, benzindenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, X and Z may be any other ligand structure capable of η-bonding to M, preferably η$_3$-bonding to M and most preferably η$^5$-bonding. In yet another embodiment, the atomic molecular weight (MW) of X or Z exceeds 60 a.m.u., preferably greater than 65 a.m.u.. In another embodiment, X and Z may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other X and Z bulky ligands include but are not limited to bulky amides, phosphides, alkoxides, aryloxides, imides, carbolides, borollides, porphyrins, phthalocyanines, corrins and other polyazomacrocycles. Independently, each X and Z may be the same or different type of bulky ligand that is bonded to M, provided however that X and Z may not be cyclopentadienyl or fluorenyl groups Independently, each X and Z may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Preferably, X and Z are independently a substituted or unsubstituted indenyl group. The indenyl group may be completely or partially substituted with one or more $C_1$ to $C_{100}$ linear, branched or cyclic aryl, alkyl, alkenyl or alkynyl groups or heteroatom containing groups. Preferred substituents for the indenyl group include methyl, ethyl, propyl, butyl, pentyl, hexyl, cyclopentyl, cyclohexyl, benzyl or phenyl groups and the like, including all their isomers, for example tertiary butyl, iso propyl etc. Non-hydrogen substituents include the atoms carbon, silicon, nitrogen, oxygen, tin, germanium and the like including olefins such as but not limited to olefinically unsaturated substituents including vinyl-terminated ligands, for example but-3-enyl, prop-2-enyl, hex-5-enyl and the like.. The substituents can be bound together to form rings.

Preferred metallocenes are those indenyl mono-and bis-cyclopentadienyl group 4 compounds described in U.S. Pat. Nos. 4,530,914, 4,805,561, 4,871,705, 4,937,299, 5,096, 867, 5,120,867, 5,210,352, 5,124,418, 5,017,714, 5,057,475, 5,064,802, 5,278,264, 5,278,119, 5,304,614, 5,324,800, 5,347,025, 5,350,723, 5,391,790 5,391,789, 5,399,636, 5,539,124, 5,455,366, 5,534,473, 5,684,098, 5,693,730, 5,698,634, 5,710,297, 5,712,354, 5,714,427, 5,714,555, 5,728,641, 5,728,839, EP-A-0 591 756, EP-A-0 520 732, EP-A-0 578,838, EP-A-0 638,595, EP-A-0 420 436, EP-B1-0 485 822, EP-B1-0 485 823, EP-A-0 743 324, EP-B1-0 518 092, WO 91/04257, WO 92/00333, WO 93/08221, WO 93/08199, WO 94/01471, WO 94/07928, WO 94/03506 WO 96/20233, WO 96/00244, WO 97/15582, WO 97/15602, WO97/19959, WO 97/46567, WO 98/01455, WO 98/06759 and WO 95/07140, all of which are fully incorporated by reference herein.

The metal compounds described herein are preferably combined with one or more activators to form an olefin polymerization catalyst system. Preferred activators include alkyl aluminum compounds (such as diethylaluminum chloride), alumoxanes, modified alumoxanes, non-coordinating anions, non-coordinating group 13 metal or metalliod anions, boranes, borates and the like. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor which ionize the neutral metallocene compound. Other useful compounds include triphenyl boron, triethyl boron, tri-n-butyl ammonium tetraethylborate, triaryl borane and the like. Other useful compounds include aluminate salts as well.

In a preferred embodiment modified alumoxanes are combined with the transition metal compound to form a catalyst system. In a preferred embodiment MMAO3A (modified methyl alumoxane in heptane, commercially available from Akzo Chemicals, Inc. under the trade name Modified Methylalumoxane type 3A, covered under U.S. Pat. No. 5,041,584) is combined with the transition metal compound to form a catalyst system.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,041,584 5,693,838, 5,731,253, 5,041,584 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994 (now U.S. Pat. No. 5,643,847), all of which are herein fully incorporated by reference. Other activators include those described in PCT publication WO 98/07515 such as tris (2, 2', 2"-nonafluorobiphenyl)fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

In another embodiment activator/support combination disclosed in U.S. Pat. No. 5,643,847 (which is incorporated by reference) can be used with the transition metal compounds described herein.

In general the transition metal compound and the activator are combined in ratios of about 1000:1 to about 0.5:1. In a preferred embodiment the metal compounds and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1.

In one embodiment of a catalyst system, the transition metal compound of the invention and/or the activator are introduced into the reactor in solution. In another embodiment, a solution of the activated transition metal compound, in an alkane such as pentane, hexane, toluene, isopentane or the like, is feed into a gas phase reactor.

POLYMERIZATION PROCESS OF THE INVENTION

The metal compounds and catalyst systems described above are suitable for use in the polymerization process of the invention. The polymerization process of the invention includes a solution, gas or slurry process or a combination thereof, most preferably a gas phase process.

In an embodiment, this invention is directed toward polymerization or copolymerization reactions involving the polymerization of one or more monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, 3-methyl-pentene-1, 3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of ethylene and one or more alpha-olefin monomers having 3 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 3 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 75° C. to 110° C., and most preferably in the range of from about 85° C. to about 95° C.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A preferred process of the invention is where the process, preferably a gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or all of the catalysts are combined with up to 10 weight % of a metal stearate, (preferably a aluminum stearate, more preferably aluminum distearate) based upon the weight of the catalyst, any support and the stearate, preferably 2 to 3 weight %. In an alternate embodiment a solution of the metal stearate is fed into the reactor. In another embodiment the metal stearate is mixed with the catalyst and fed into the reactor separately. These agents may be mixed with the catalyst or may be fed into the reactor in a solution with or without the catalyst system or its components.

More information on using aluminum stearate type additives may be found in U.S. Ser. No. 09/113,261 filed Jul. 10, 1998, which is incorporated by reference herein.

The catalyst and/or the activator may be placed on, deposited on, contacted with, incorporated within, adsorbded, or absorbed in a support. Typically the support can be of any of the solid, porous supports, including microporous supports. Typical support materials include talc; inorganic oxides such as silica, magnesium chloride, alumina, silica-alumina; polymeric supports such as polyethylene, polypropylene, polystyrene, cross-linked polystyrene; and the like. Preferably the support is used in finely divided form. Prior to use the support is preferably partially or completely dehydrated. The dehydration may be done physically by calcining or by chemically converting all or part of the active hydroxyls. For more information on how to support catalysts please see U.S. Pat. No. 4,808,561 which discloses how to support a metallocene catalyst system. The techniques used therein are generally applicable for this invention.

In a preferred embodiment the polymer produced herein has a melt index ratio "MIR" of $I_{21}/I_2$ (as measured by ASTM 1238, conditions F and E, respectively at 190° C.) of 25 or more, preferably 35 or more, preferably 50 or more, preferably 65 or more, preferably 100 or more.

In another embodiment the polymer produced herein has a melt strength of 7 cN or more, preferably 9 cN or more, more preferably 10 cN or more, and even more preferably 12 cN or more, as measured with an Instron capillary rheometer in conjunction with the Goettfert Rheotens melt strength apparatus. A polymer melt strand extruded from the capillary die is gripped between two counter-rotating wheels on the apparatus. the take up speed is increased at a constant acceleration of 24 mm/sec$^2$, which is controlled by the Acceleration Programmer (Model 45917, at a setting of 12). The maximum pulling force (in cN) achieved before the strand breaks or starts to show draw resonance is determined as the melt strength. The temperature of the rheometer is set at 190° C. The capillary die has a length of one inch (2.54 cm) and a diameter of 0.06 inch (0.15 cm). The polymer melt is extruded from the die at a piston speed of 3 inch/min (7.62 cm/min). The distance between the die exit and the wheel contact point should be 3.94 inches (100 mm).

Molecular weight (Mw, Mz and Mn) and molecular weight distributions (Mw/Mn and Mz/Mw) are measured by Gel Permeation Chromatography using a Waters 150 Gel Permeation Chromatograph equipped with a differential refractive index detector and calibrated using polyethylene standards. Samples were run in 1,2,4-trichlorobenzene at 135° C. with a concentration of 1.0–1.5 mg/ml. The injection volume was 300 μl. The column set was either three Polymer Laboratories PLGEL Mixed A columns (with flow rate of 1 ml/min) or three Polymer Laboratories PLGEL Mixed B columns (with flow rate of 0.5 ml/min). This general technique is discussed in "Liquid Chromatography of Polymers and Related Materials III," J. Cazes Ed., Marcel Decker, 1981, page 207.

In a preferred embodiment the polymer produced has an Mw/Mn of 2.5 to 10, preferably 3.0 to 7.0 more preferably 3.5–6.0. In another preferred embodiment the polymer produced has an Mz/Mw of 2.0 to 4.0, preferably 2.0 to 3.5 more preferably 2.5–3.5.

In another embodiment the polymer produced herein has an Mw of 60,000 or more, preferably 70,000 or more, preferably 80,000 or more.

In another embodiment the polymer produced herein has a density as measured by ASTM 1505 of 0.900 to 0.955, preferably 0.910–0.945, more preferably 0.915–0.935 g/cm$^3$.

In another embodiment the polymer produced herein has a compositional distribution breadth index (CDBI) of 60 or more, preferably 65 or more even more preferably 70 or more. Composition distribution breadth index is a means of measuring the distribution of co-monomer between polymer chains in a given sample. CDBI is measured according to the procedure in WO 93/03093, published Feb. 18, 1993, provided that fraction having a molecular weight below 10,000 Mn are ignored for the calculation.

In a preferred embodiment, the polyolefin recovered typically has a melt index ($I_2$) as measured by ASTM D-1238, Condition E, at 190° C. of 3000 g/10 min or less. In a preferred embodiment the polyolefin is ethylene homopolymer or copolymer. In a preferred embodiment for certain applications, such as films, molded article and the like a melt index of 100 g/10 min or less is preferred. For some films and molded article a melt index of 10 g/10 min or less is preferred. In a particularly preferred embodiment the melt index is 1.5 g/10 min or less.

In a preferred embodiment the catalyst system described above is used to make a polyethylene having a density of between 0.90 and 0.970 g/cm$^3$ (as measured by ASTM 1505) and a melt index of 10 or less g/10 min or less (as measured by ASTM D-1238, Condition E, at 190° C.), preferably 0.01 to 10 g/10 min. Polyethylene having a melt index of between 0.01 to 100 dg/min is preferably produced. In some embodiments, a density of 0.915 to 0.940 g/cm$^3$ would be preferred, in other embodiments densities of 0.930 to 0.970 g/cm$^3$ are preferred.

The polyolefins then can be made into films, molded articles, pipes, sheets, wire and cable coating and the like. The films may be formed by any of the conventional techniques known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

EXAMPLES

Molecular weight (Mw, Mz and Mn) and molecular weight distributions (Mw/Mn and Mz/Mw) are measured as Gel Permeation Chromatography using a Waters 150 Gel Permeation Chromatograph equipped with a differential refractive index detector and calibrated using polyethylene standards. Samples were run in 1,2,4-trichlorobenzene at 135° C. with a concentration of 1.0–1.5 mg/mi. The injection volume was 300 μl. The column set was either three Polymer Laboratories PLGEL Mixed A columns (with flow rate of 1 ml/min) or three Polymer Laboratories PLGEL Mixed B columns (with flow rate of 0.5 ml/min). This general technique is discussed in "Liquid Chromatography of Polymers and Related Materials III," J. Cazes Ed., Marcel Decker, 1981, page 207.

Melt Index (MI) $I_2$ and $I_{21}$ were measured according to ASTM D-1238, Conditions E and F, respectively at 190° C.

Melt Index Ratio is the ratio of $I_{21}$ over $I_2$ as determined by ASTM 1238.

Weight % comonomer was measured by proton NMR.

MWD=Mw/Mn.

Density ASTM-D 1505.

Melt Strength is measured with an Instron capillary rheometer in conjunction with the Goettfert Rheotens melt strength apparatus. A polymer melt strand extruded from the capillary die is gripped between two counter-rotating wheels on the apparatus. the take up speed is increased at a constant acceleration of 24 mm/sec², which is controlled by the Acceleration Programmer (Model 45917, at a setting of 12). The maximum pulling force (in cN) achieved before the strand breaks or starts to show draw resonance is determined as the melt strength. The temperature of the rheometer is set at 190° C. The capillary die has a length of one inch (2.54 cm) and a diameter of 0.06 inch (0.15 cm). The polymer melt is extruded from the die at a piston speed of 3 inch/min (7.62 cm/min). The distance between the die exit and the wheel contact point should be 3.94 inches (100 mm).

All reactions were performed under nitrogen in dry boxes or connected to Schlenk lines unless stated otherwise. Lithium tetramethylcyclopentadienyl was purchased from Strem and used as received. 30 wt % methylalumoxane in toluene was purchased from Albermarle and used as received. Triethylaluminum was purchased from Akzo Nobel and used as received. $Zr(NMe_2)_4$ was prepared by the method described by Jordan et al. (Organometallics 1995, 14, 5.)

rac-$(CH3)_2Si(Ind)_2ZrCl_2$ was purchased from Albermarle and used as received. (Ind=indenyl.)

Synthesis

Example 1

1-1. $CH_3(CH_2\!=\!CH)Si(IndeneH)_2$ $CH_3(CH_2\!=\!CH)Si(IndeneH)_2$ was prepared using the procedure Jordan et a!. (Organometallics 1996, 15, 4038) reported for the synthesis of $(CH_3)_2Si(IndeneH)_2$. An orange oil was obtained and used without further purification.

1-2. rac-$CH_3(CH_2\!=\!CH)Si(Ind)_2Zr(NMe_2)_2$ $CH_3(CH_2\!=\!CH)Si(Ind^*H)_2$ (8.4 grams) was combined with $Zr(NMe_2)_4$ (7.2 grams) in hexane (300 mls) and attached to an oil bubbler. The solution was stirred at reflux overnight. A dark red solution resulted. The solvent was removed under vacuum. A minimum of pentane was added and the solution was stored for several days at −30° C. 8.5 grams of ruby red crystals formed of one isomer. $^1$H NMR $(C_6D_6)$; δ0.89 (s), 2.46 (s), 2.48(s), 6.2–6.36 (m), 6.67–7.0 (m), 7.47–7.60 (m), 7.76–7.79 (m). (Ind*= tetrahydroindenyl)

1-3. rac-$CH_3(CH_2\!=\!CH)Si(Ind)_2ZrCl_2$ $CH_3(CH_2\!=\!CH)Si(Ind)_2Zr(NMe_2)_2$ (5 grams) was combined with TMSCl(tetramethylsilylchloride) (>10 equivalents) in toluene (200 mls). The solution was stirred overnight. The resulting solution was concentrated and pentane was added resulting in the isolation of a yellow precipitate. (3.8 grams) $^1$H NMR $(C_6D_6)$; δ0.62 (s), 5.76 (d), 5.90 (d), 5.91–6.14 (m), 6.37–6.51 (m), 6.77–6.9 (m), 7.12–7.23 (m), 7.36–7.45 (m).

Synthesis of Supported Catalysts

Example 2

Catalyst A

Methylalumoxane (30 wt % in toluene) (37.72 grams) was combined with 39.0 grams of toluene in a 500 ml flask. The addition of 0.704 grams of rac-$CH_3(CH_2\!=\!CH)Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

Example 3

Catalyst B

Methylalumoxane (30 wt % in toluene) (37.72 grams) was combined with 39.0 grams of toluene in a 500 ml flask. The addition of 0.524 grams of rac-$CH_3(CH_2\!=\!CH)Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

Example 4

Catalyst C

Methylalumoxane (30 wt % in toluene) (37.72 grams) was combined with 39.0 grams of toluene in a 500 ml flask. The addition of 0.352 grams of rac-$CH_3(CH_2\!=\!CH)Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

Example 5

Catalyst D

Methylalumoxane (30 wt % in toluene) (37.72 grams) was combined with 39.0 grams of toluene in a 500 ml flask. The addition of 0.18 grams of rac-$CH_3(CH_2\!=\!CH)Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

Comparative Example 6

Catalyst E (Comparative)

Methylalumoxane (30 wt % in toluene) (37.72 grams) was combined with 39.0 grams of toluene in a 500 ml flask. The addition of 0.73 grams of rac-$(CH_3)_2Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a orange powder.

Comparative Example 7

Catalyst F (Comparative)

Methylalumoxane (30 wt % in toluene) (37.72 grams) was combined with 39.0 grams of toluene in a 500 ml flask. The addition of 0.55 grams of rac-$(CH_3)_2Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a orange powder.

Comparative Example 8

Catalyst g (Comparative)

Methylalumoxane (30 wt % in toluene) (37.72 grams) was combined with 39.0 grams of toluene in a 500 ml flask. The addition of 0.363 grams of rac-$(CH_3)_2Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a orange powder.

Example 9

Slurry-Phase Ethylene-Hexene Polymerization

Polymerizations were conducted in a stainless steel, 1-liter Zipperclave autoclave reactor. The reactor was equipped with water jacket for heating and cooling. Injections were performed via a high pressure nitrogen injection.

(400 mls isobutane, 15 mls of hexene, and 15 µls triethylaluminum.) Before polymerizations the reactor was purged with nitrogen for several hours at 100° C. Upon injection of catalyst ethylene was fed continuously on demand keeping the reactor pressure constant (130 psig ethylene (0.9 MPa)) while maintaining the reaction temperature at 85° C. After the allotted time the reaction was stopped by cooling and venting the pressure and exposing the contents of the reactor to air. The liquid components were evaporated and the poly(ethylene-co-hexene-1) resin was dried under a $N_2$ purge. Weight average molecular weight (Mw), number average molecular weight (Mn) and their ratio Mw/Mn were obtained by GPC gel permeation chromatography. Hexene wt % incorporation was obtained from $^1H$ NMR data.

The above procedure was performed using 25 mgs of Catalyst A. After 40 minutes the reaction was stopped. No reactor fouling was observed.
Run 1: –35.5 grams of polymer resin (2370 g pol./g cat. h); Mw=124000,
Mn=34500, Mw/Mn=3.59; Hexene wt %=6.7.
Run 2; 35.6 grams of polymer resin (2370 g pol./g cat. h); Mw=153000,
Mn=38200, Mw/Mn=4.00; Hexene wt %=6.0.

Example 10

The above procedure in Example 10 was repeated using 25 mgs of Catalyst D After 40 minutes the reaction was stopped. No reactor fouling was observed. Run 1: 35.5 grams of polymer resin (1300 g pol/g cat hr); Mw=157,000, Mn=44,600, Mw/Mn=3.53: Hexene wt %=6.9%.

Example 11

The above procedure in Example 10 was repeated using 25 mgs of Catalyst E After 40 minutes the reaction was stopped. No reactor fouling was observed. Run 1: 35.5 grams of polymer resin (2440 g pol/g cat hr); Mw=178,000, Mn=42,800, Mw/Mn=4.16: Hexene wt %=5.9%.

Example 12

The above procedure in Example 10 was repeated using 25 mgs of Catalyst F After 40 minutes the reaction was stopped. No reactor fouling was observed. Run 1: 35.5 grams of polymer resin (2370 g pol/g cat hr); Mw=131,000, Mn=37,500, Mw/Mn=3.51: Hexene wt %=7.2%.

Example 13

The above procedure in Example 10 was repeated using 25 mgs of Catalyst G After 40 minutes the reaction was stopped. No reactor fouling was observed. Run 1: 35.5 grams of polymer resin (2370 g pol/g cat hr); Mw=190,000, Mn=47,900, Mw/Mn=3.97: Hexene wt %=5.3%.

Example 14

Catalysts A, B and C were then run in a lab scale gas phase reactor. The reactor was a fluidized bed reactor equipped with devices for temperature control, catalyst feeding, or injection equipment, GC analyzer for monitoring and controlling monomer and gas feeds and equipment for polymer sampling and collecting. The reactor consists of a 6 inch (15.24 cm) diameter bed section increasing to 10 inches (25.4 cm) a the reactor top. Gas comes in through a perforated distributor plate allowing fluidization of the bed contents and polymer sample is discharged at the reactor top. The reaction conditions and date are presented in Table 1.

TABLE I

|  | Catalyst A | Catalyst B | Catalyst C |
|---|---|---|---|
| [$H_2$] (ppm) | 239 | 503 | 342 |
| $H_2$ flow (sccm) | 0.0 | 3.30 | 4.07 |
| [$C_6$] (mol %) | 0.22 | 0.24 | 0.33 |
| [$C_2$] (mol %) | 30.0 | 35.0 | 35.0 |
| $C_6/C_2$ | 0.07 | 0.08 | 0.08 |
| $C_2$ flow (g/hr) | 530 | 654 | 557 |
| $H_2/C_2$ ratio | 8.0 | 14.4 | 9.8 |
| Reactor pressure | 300psi(2.1 MPa) | 300psi(2.1 MPa) | 300psi(2.1 MPa) |
| Reactor Temp | 175° F. (79° C.) | 175° F. (79° C.) | 175° F. (79° C.) |
| Residence time | 5.9 hr | 4.2 hr | 6.0 hr |
| Productivity (g/g MB) | 2042 | 1372 | 926 |
| Productivity (g XRF) | 1331 |  | 1037 |
| Bulk density (g/cm$^3$) | 0.4120 | 0.4485 | 0.4543 |
| CDBI | 64 | 60 | 70 |
| Melt Str (cN) | 11.8 | 10.5 | 8.9 |
| MIR ($I_{21}/I_2$) | 28 | 37 | 52 |
| Melt Index (g/10 min) | 1.21 | 1.17 | 0.91 |
| Density (g/cm$^3$) | 0.9185 | 0.9196 | 0.9260 |
| Mw | 105,000 | 99,600 | 99,900 |
| Mn | 33,700 | 31,100 | 18,800 |
| Mw/Mn | 3.14 | 3.20 | 5.31 |
| Hexene wt % | 8.7 | 8.6 | 9.7 |

MB = mass balance; XRF = X- ray fluorescence; productivity is the number of grams of product per gram of catalyst.

Note: 1.0 MI plastic was not obtained for Catalysts D, E and F due to inoperability of catalysts. (reactor sheeting/chunking.) Catalyst E (shut down due to sheeting) shut down material had an MI of 1.7 g/10 min, an MIR of 72.3. Catalyst F (shut down due to chunking) shut down material had an MI of 0.72 g/10 min, and an MIR of 121.

It can be seen that different amounts of zirconium loading (i.e. different Zr:Al ratios) of the activated catalyst onto supports produced polymers having different balances of properties (such as MIR and melt strength). Catalysts that make plastics that have both high melt strength and high MIR values are highly desired. Hence, it is desirable to select catalysts and ligands to affect the plastic produced in a desirable way such as influencing the melt strength and/or MIR (an indicator of the processability) of the resulting plastic. rac-Dimethylsilyl bisindenyl zirconium dichloride has been shown to exhibit high MIR values: however, the melt strengths were rather low and exhibited poor bubble stability during film extrusion. Furthermore, high MIR values usually translate to poor operability (sheeting/reactor fouling) particularly in fluidized bed gas phase reactors. (Catalysts D–F in the experiments above.) It has been found that the presence of the vinyl moiety on the bridging group of indenyl metallocenes dramatically improved the melt strength and reduced the MIR. Also this catalysts unexpectedly ran in a fluidized bed reactor without shutdown under three different metallocene loadings.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A process for polymerizing olefin(s) in the presence of a catalyst system comprising a transition metal compound represented by the following formula:

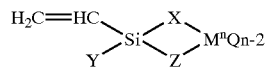

wherein
Y is hydrogen or a hydrocarbyl group, a halogen or a heteroatom,
X and Z are independently a substituted or unsubstituted bulky ligand, provided however, that X and Z may not be a cyclopentadienyl or fluorenyl group,
M is a group 4 metal,
n is the oxidation state of the metal, preferably 3 or 4, preferably 4,
each Q is, independently, an anionic leaving group.

2. The process of claim 1 wherein X and Z are independently a substituted or unsubstituted indenyl group.

3. The process of claim 1 wherein the process is a gas phase process.

4. The process of claim 2, wherein one or both of the indenyl groups is completely or partially substituted with one or more $C_1$ to $C_{100}$ linear, branched or cyclic aryl, alkyl, alkenyl or alkynyl groups, heteroatom containing groups.

5. The process of claim 4 wherein the indenyl group is completely or partially substituted with one or more methyl, ethyl, propyl, butyl, pentyl, hexyl, cyclopentyl, cyclohexyl, benzyl or phenyl groups.

6. The process of claim 1 wherein each Q is independently hydrogen, halogen or a hydrocarbyl group.

7. The process of claim 1 wherein each Q is, independently, a hydride, substituted or unsubstituted hydrocarbyl, a halide, substituted or unsubstituted carboxylate, a substituted or unsubstituted heteroatom, substituted or unsubstituted alkoxide, substituted or unsubstituted aryloxide, substituted or unsubstituted amide, substituted or unsubstituted phosphide, imide, carbolide, borollide, porphyrin, phthalocyanine, corrin and other polyazomacrocycle, any two Q's can be bound together or form a ring, an alkylidene ligand, or a cyclometallated ligand or other divalent chealating ligand.

8. The process of claim 1 further comprising combining an activator with the transition metal compound wherein the activator comprises alkyl aluminum compounds, alumoxanes, modified alumoxanes, non-coordinating anions, boranes, borates and/or ionizing compounds.

9. The process of claim 8 wherein the activator comprises alumoxanes and/or modified alumoxanes.

10. The process of claim 1 wherein the olefin comprises ethylene.

11. The process of claim 1 wherein the olefin comprises propylene.

12. The process of claim 1 wherein the olefin comprises ethylene and a $C_3$ to $C_{20}$ alpha olefin.

13. The process of claim 1, wherein the olefin comprises ethylene and hexene and/or butene.

14. The process of claim 1, wherein the polymer produced has an MIR of 25 or more and a melt strength of 7 cN or more.

15. The process of claim 1, wherein the polymer produced has a melt strength of 7 cN or more, an MIR of 25 or more, a density of 0.900 g/cm$^3$ or more and a melt index of 1.5 dg/min or less.

16. The process of claim 8 wherein the transition metal compound and/or the activator are on a support.

17. The process of claim 16 wherein the support is talc; an oxide of silica, magnesium chloride, alumina, or silica-alumina; polyethylene, polypropylene, polystyrene, cross-linked polystyrene; or a mixture thereof.

* * * * *